US011879829B2

(12) United States Patent
Halpert

(10) Patent No.: US 11,879,829 B2
(45) Date of Patent: Jan. 23, 2024

(54) METHODS AND SYSTEMS FOR CLASSIFYING FLUORESCENT FLOW CYTOMETER DATA

(71) Applicant: Becton, Dickinson and Company, Franklin Lakes, NJ (US)

(72) Inventor: Richard Lee Halpert, Ashland, OR (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 0 days.

(21) Appl. No.: 17/968,131

(22) Filed: Oct. 18, 2022

(65) Prior Publication Data
US 2023/0045219 A1 Feb. 9, 2023

Related U.S. Application Data

(63) Continuation of application No. 17/153,500, filed on Jan. 20, 2021, now Pat. No. 11,506,593.
(Continued)

(51) Int. Cl.
*G01N 15/14* (2006.01)
*G06F 18/23* (2023.01)
(Continued)

(52) U.S. Cl.
CPC ....... *G01N 15/1459* (2013.01); *G01N 15/147* (2013.01); *G01N 15/1434* (2013.01);
(Continued)

(58) Field of Classification Search
CPC ........... G01N 15/1459; G01N 15/1434; G01N 15/147; G01N 2015/1006;
(Continued)

(56) References Cited

U.S. PATENT DOCUMENTS 11,506,593 B2 * 11/2022 Halpert ................ G06V 20/698
11,674,879 B2 * 6/2023 Halpert .............. G01N 15/1459
702/19
(Continued)

OTHER PUBLICATIONS

Lucchesi, et al., "From Bivariate to Multivariate Analysis of Cytometric Data: Overview of Computational Methods and Their Application in Vaccination Studies", Vaccines 2020, 8, 138, 20 pages.
(Continued)

*Primary Examiner* — Roy M Punnoose
(74) *Attorney, Agent, or Firm* — Bret E. Field; BOZICEVIC, FIELD & FRANCIS LLP

(57) ABSTRACT

Methods for classifying fluorescent flow cytometer data are provided. In some instances, methods include processing the flow cytometer data with a supervised algorithm configured to cluster the fluorescent flow cytometer data into distinct populations according to the relationship of data points to relevant threshold values. In embodiments, methods include determining a measure of spillover spreading by calculating spillover spreading coefficients and combining them in a spillover spreading matrix. In some embodiments, populations of fluorescent flow cytometer data are adjusted to subtract the magnitude of spillover spreading. In embodiments, spillover spreading adjusted populations are partitioned after potential partitions are evaluated relative to the threshold values. In embodiments, partitioned populations of fluorescent flow cytometer data are classified (i.e., phenotyped) according to a hierarchy. Systems and computer-readable media for classifying fluorescent flow cytometer data are also provided.

22 Claims, 10 Drawing Sheets

Related U.S. Application Data

(60) Provisional application No. 63/053,108, filed on Jul. 17, 2020, provisional application No. 62/968,516, filed on Jan. 31, 2020.

(51) Int. Cl.

| | | |
|---|---|---|
| *G06F 18/213* | (2023.01) | |
| *G06V 10/762* | (2022.01) | |
| *G06V 10/77* | (2022.01) | |
| *G06V 20/69* | (2022.01) | |
| *G01N 15/10* | (2006.01) | |

(52) U.S. Cl.
CPC .......... *G06F 18/213* (2023.01); *G06F 18/23* (2023.01); *G06V 10/762* (2022.01); *G06V 10/7715* (2022.01); *G06V 20/698* (2022.01); *G01N 2015/1006* (2013.01); *G01N 2015/1402* (2013.01); *G01N 2015/145* (2013.01)

(58) Field of Classification Search
CPC ..... G01N 2015/1402; G01N 2015/145; G01N 15/1429; G06F 18/213; G06F 18/23; G06V 10/762; G06V 10/7715; G06V 20/698

See application file for complete search history.

(56) References Cited

U.S. PATENT DOCUMENTS

| | | | |
|---|---|---|---|
| 2010/0256943 A1 | 10/2010 | Donnenberg et al. | |
| 2011/0204259 A1* | 8/2011 | Rogers | G01N 15/1429 250/459.1 |
| 2014/0087394 A1 | 3/2014 | Yan et al. | |
| 2016/0025621 A1* | 1/2016 | Kapinsky | G01N 15/1425 702/30 |
| 2019/0353577 A1 | 11/2019 | Zhang | |

OTHER PUBLICATIONS

Maecker, et al. "Selecting fluorochrome conjugates for maximum sensitivity", Cytometry A, Wiley-Liss, Hoboken, USA, No. 2, 2004, pp. 169-173.

Nguyen, et al. "Quantifying spillover spreading for comparing instrument performance and aiding in multicolor panel design", Cytometry A, Wiley-Liss, Hoboken, USA, No. 3, 2013, pp. 306-315.

\* cited by examiner

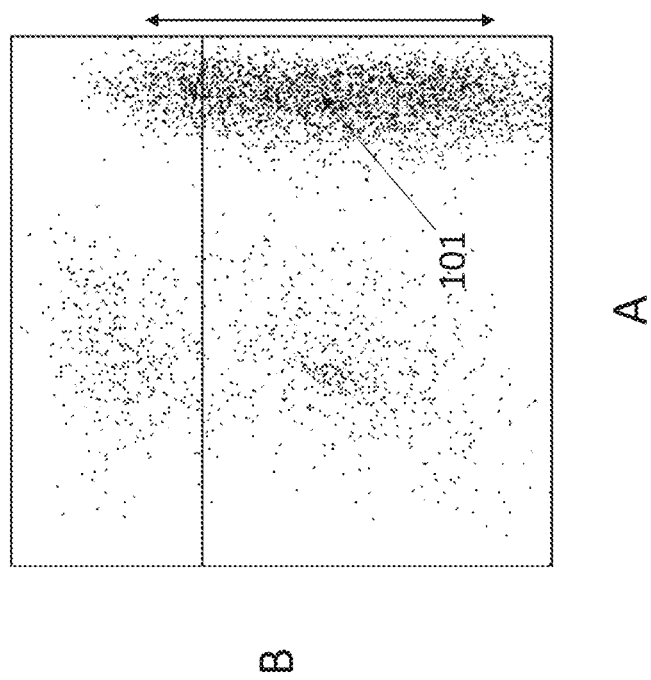

CD4+ and CD8- → CD4 T Cell
CD4- and CD8+ → CD8 T Cell
CD4+ and CD8+ → Double Positive T Cell
CD4- and CD8- → Double Negative T Cell

METHODS AND SYSTEMS FOR CLASSIFYING FLUORESCENT FLOW CYTOMETER DATA

CROSS-REFERENCE TO RELATED APPLICATIONS

This application is a continuation of U.S. patent application Ser. No. 17/153,500, filed Jan. 20, 2021, which claims priority to U.S. Provisional Patent Application Ser. No. 62/968,516, filed Jan. 31, 2019, and to U.S. Provisional Patent Application Ser. No. 63/053,108 filed Jul. 17, 2019, the disclosures of which applications are incorporated herein by reference.

INTRODUCTION

Flow cytometry is a technique used to characterize and often times sort biological material, such as cells of a blood sample or particles of interest in another type of biological or chemical sample. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. To characterize the components of the flow stream, the flow stream is irradiated with light. Variations in the materials in the flow stream, such as morphologies or the presence of fluorescent labels, may cause variations in the observed light and these variations allow for characterization and separation. For example, particles, such as molecules, analyte-bound beads, or individual cells, in a fluid suspension are passed by a detection region in which the particles are exposed to an excitation light, typically from one or more lasers, and the light scattering and fluorescence properties of the particles are measured. Particles or components thereof typically are labeled with fluorescent dyes to facilitate detection. A multiplicity of different particles or components may be simultaneously detected by using spectrally distinct fluorescent dyes to label the different particles or components. In some implementations, a multiplicity of detectors, one for each of the scatter parameters to be measured, and one or more for each of the distinct dyes to be detected are included in the analyzer. For example, some embodiments include spectral configurations where more than one sensor or detector is used per dye. The data obtained comprise the signals measured for each of the light scatter detectors and the fluorescence emissions.

Flow cytometers may further comprise means for recording the measured data and analyzing the data. For example, data storage and analysis may be carried out using a computer connected to the detection electronics. For example, the data can be stored in tabular form, where each row corresponds to data for one particle, and the columns correspond to each of the measured features. The use of standard file formats, such as an "FCS" file format, for storing data from a particle analyzer facilitates analyzing data using separate programs and/or machines. Using current analysis methods, the data typically are displayed in 1-dimensional histograms or 2-dimensional (2D) plots for ease of visualization, but other methods may be used to visualize multidimensional data.

The parameters measured using, for example, a flow cytometer typically include light at the excitation wavelength scattered by the particle in a narrow angle along a mostly forward direction, referred to as forward scatter (FSC), the excitation light that is scattered by the particle in an orthogonal direction to the excitation laser, referred to as side scatter (SSC), and the light emitted from fluorescent molecules in one or more detectors that measure signal over a range of spectral wavelengths, or by the fluorescent dye that is primarily detected in that specific detector or array of detectors. Different cell types can be identified by their light scatter characteristics and fluorescence emissions resulting from labeling various cell proteins or other constituents with fluorescent dye-labeled antibodies or other fluorescent probes.

Both flow and scanning cytometers are commercially available from, for example, BD Biosciences (San Jose, Calif.). Flow cytometry is described in, for example, Landy et al. (eds.), Clinical Flow Cytometry, Annals of the New York Academy of Sciences Volume 677 (1993); Bauer et al. (eds.), Clinical Flow Cytometry: Principles and Applications, Williams & Wilkins (1993); Ormerod (ed.), Flow Cytometry: A Practical Approach, Oxford Univ. Press (1994); Jaroszeski et al. (eds.), Flow Cytometry Protocols, Methods in Molecular Biology No. 91, Humana Press (1997); and Practical Shapiro, Flow Cytometry, 4th ed., Wiley-Liss (2003); all incorporated herein by reference. Fluorescence imaging microscopy is described in, for example, Pawley (ed.), Handbook of Biological Confocal Microscopy, 2nd Edition, Plenum Press (1989), incorporated herein by reference.

After flow cytometer data is received from one or more detectors, it is often subjected to a data analysis process through which it can be made intelligible to the user. In some cases, flow cytometer data analysis involves determining the phenotype associated with the analytes (e.g., cells, particles) being irradiated in the flow cytometer. For the majority of all cytometry samples, it is necessary to identify cell type subsets (i.e., phenotypes) before any deeper analysis is possible. In a typical workflow, a pre-planned gating hierarchy recapitulating universally accepted definitions of cell types must be manually adjusted to suit the data of each sample (to account for biological effects, batch effects, and any other peculiarities). Adjustment approaches can be either "unsupervised" or "supervised". Unsupervised approaches begin with clustering flow cytometer data into populations, and then attempting to assign cell type labels (i.e., phenotypes) to each population cluster using some a priori knowledge regarding the association of particular analytes with certain parameters (e.g., fluorescence). On the other hand, supervised approaches typically begin with establishing a gating hierarchy, i.e., a set of rules governing how an individual cell is classified (i.e., phenotyped) based on its status with respect to one or more parameters. Subsequently, flow cytometer data "fit" to the gating hierarchy such that individual data points fall somewhere on the hierarchy. The DAFi algorithm, for example, fits clusters of events to an existing gating tree based on their centroids, which allows cell types to be delineated along natural boundaries in the data rather than fixed gate boundaries. The DAFi algorithm is described in, for example, Lee et al. (2018). DAR: a directed recursive data filtering and clustering approach for improving and interpreting data clustering identification of cell populations from polychromatic flow cytometry data. *Cytometry Part A*, 93(6), 597-610: herein incorporated by reference. FlowDensity, on the other hand, finds density troughs in the data to use as gate boundaries for a pre-defined hierarchy. The FlowDensity Algorithm is described in, for example, Malek et al. (2015). flowDensity: reproducing manual gating of flow cytometry data by automated density-based cell population identification. *Bioinformatics*, 31(4), 606-607; herein incorporated by reference. However, the DAFi algorithm can only account for small sample-to-sample variation, and the FlowDensity algorithm requires hands-on auto-phenotyping expert tuning on a per-panel basis.

The Ek' Balam algorithm represents an approach to flow cytometer data adjustment that improves upon the DAFi and FlowDensity algorithms in that the Ek' Balam algorithm is easy to tune and can handle large sample-to-sample variation. However, flow cytometry data analysis protocols involving the measurement of two or more parameters (e.g., fluorescent signals), such as the Ek' Balam algorithm, are complicated by spillover, a phenomenon in which particle-modulated light indicative of a particular fluorochrome is received by one or more detectors that are not configured to measure that parameter. As such, light may "spill-over" and be detected by off-target detectors. Spillover can be corrected by unmixing, in which new per-fluorochrome intensity values are calculated by solving a system of equations relating the fluorochrome intensity values to the measured detector values via the observed levels of spillover. Unmixing is often called "compensation" when the number of detectors is equal to the number of fluorochromes being unmixed. Although unmixing corrects intensity contributions from each fluorochrome into each other fluorochrome, it cannot correct noise contributions, i.e., the error contributed to the fluorescent flow cytometer data by spillover. This noise is called "spillover spreading". In some instances, spillover spreading noise is constructive, which results in signal intensities that are higher than would otherwise be observed, while in other instances the noise is destructive, resulting in lower intensities. For example, FIG. 1 demonstrates how population 101 spreads due to presence of noise from fluorochrome A on detectors used to measure fluorochrome B. Due to population spread, classification (i.e., phenotyping) of fluorescent flow cytometer data by data analysis protocols may be rendered inaccurate. For example, FIG. 2A and FIG. 2B demonstrate the effect of spillover spreading on the Ek' Balam algorithm's ability to correctly distinguish between distinct population clusters of flow cytometer data. As shown in FIG. 2B, population 101 is partitioned incorrectly and a portion of the population is consequently assigned an incorrect phenotype (i.e., $A^+B^+$ rather than $A^+B^-$). Accordingly, a solution for spillover spreading in flow cytometer data analysis is required.

SUMMARY

Aspects of the invention include methods for classifying fluorescent flow cytometer data. In some embodiments, the methods include processing the flow cytometer data with a supervised algorithm configured to cluster the fluorescent flow cytometer data into populations. In embodiments, fluorescent flow cytometer data is clustered based on each data point's status relative to a hierarchy. In such embodiments, fluorescent flow cytometer data is clustered into populations based on positivity or negativity of the fluorescent flow cytometer data with respect to particular fluorochromes. In some embodiments, fluorescent flow cytometer data is determined to be positive or negative for a particular fluorochrome based on a relationship of the fluorescent flow cytometer data to a threshold value. After data is clustered, embodiments of the instant method include determining a measure of spillover spreading. In some embodiments, determining spillover spreading includes calculating a spillover spreading coefficient that quantifies the extent to which the intensity of light collected from a first fluorochrome by a first detector is impacted by the simultaneous collection of light from a second fluorochrome by the same detector. In embodiments, a spillover spreading coefficient is calculated for each possible combination of fluorescent light detector and fluorochrome in order to determine the extent to which light emitting from a particular fluorochrome is collected at a given detector. In some embodiments, spillover spreading coefficients are combined in a spillover spreading matrix. In certain embodiments, populations of fluorescent flow cytometer data are adjusted to account for the magnitude of spillover spreading determined in the spillover spreading matrix. Practicing the instant method may further include partitioning the distinct spillover spreading adjusted populations of fluorescent flow cytometer data. In embodiments, partitioning the populations involves calculating Matthew's correlation coefficient, and establishing a partition delineating between separate populations (i.e., populations exhibiting different fluorescent parameters) in a manner that optimizes Matthew's correlation coefficient with respect to each relevant threshold. In embodiments, partitioned populations of fluorescent flow cytometer data are subsequently classified such that the distinct populations are associated with a respective subtype (i.e., phenotype).

Aspects of the invention also include systems for classifying fluorescent flow cytometer data. In some embodiments, systems include a particle analyzer configured to produce fluorescent flow cytometer data. Systems may also include a processor having memory operably coupled to the processor wherein the memory includes instructions stored thereon, which when executed by the processor, cause the processor to process the flow cytometer data with a supervised algorithm configured to cluster the fluorescent flow cytometer data into populations. In embodiments, fluorescent flow cytometer data is clustered based on each data point's status relative to a hierarchy. In such embodiments, fluorescent flow cytometer data is clustered into populations based on positivity or negativity of the fluorescent flow cytometer data with respect to particular fluorochromes. In some embodiments, fluorescent flow cytometer data is determined to be positive or negative for a particular fluorochrome based on a relationship of the fluorescent flow cytometer data to a threshold value. After data is clustered, the processor may be configured to determine a measure of spillover spreading. In some embodiments, determining spillover spreading includes calculating a spillover spreading coefficient that quantifies the extent to which the intensity of light collected from a first fluorochrome by a first detector is impacted by the simultaneous collection of light from a second fluorochrome by the same detector. In embodiments, a spillover spreading coefficient is calculated for each possible combination of fluorescent light detector and fluorochrome in order to determine the extent to which light emitting from a particular fluorochrome is collected at a given detector. In some embodiments, the processor is configured to combine spillover spreading coefficients in a spillover spreading matrix. In certain embodiments, populations of fluorescent flow cytometer data are adjusted to account for the magnitude of spillover spreading determined in the spillover spreading matrix. The processor may be further configured to partition the distinct spillover spreading adjusted populations of fluorescent flow cytometer data. In embodiments, partitioning the populations involves calculating Matthew's correlation coefficient, and establishing a partition delineating between separate populations (i.e., populations exhibiting different fluorescent parameters) in a manner that optimizes Matthew's correlation coefficient with respect to each relevant threshold. In embodiments, partitioned populations of fluorescent flow cytometer data are subsequently classified such that the distinct populations are associated with a respective subtype (i.e., phenotype).

Aspects of the present disclosure further include computer-controlled systems, where the systems further include one or more computers for complete automation or partial automation. In some embodiments, systems include a computer having a computer readable storage medium with a computer program stored thereon, where the computer program when loaded on the computer includes instructions for clustering fluorescent flow cytometer data into populations according to one or more different parameters (i.e., fluorochromes), determining the spillover spreading between each detector-parameter pair (i.e., by calculating spillover spreading coefficients), creating a spillover spreading matrix demonstrating how the detection of a particular fluorochrome by its corresponding detector is impacted by spillover from other fluorochromes, adjusting the fluorescent flow cytometer data to compensate for spillover spreading by subtracting the magnitude of the spillover spreading as determined by the spillover spreading matrix, evaluating the quality of different partitions separating distinct populations of fluorescent flow cytometer data by calculating Matthew's correlation coefficient with respect to thresholds distinguishing between populations that are positive for a given parameter and population that are negative for a given parameter, and classifying (i.e., phenotyping) adjusted populations of fluorescent flow cytometer data.

BRIEF DESCRIPTION OF THE FIGURES

The invention may be best understood from the following detailed description when read in conjunction with the accompanying drawings. Included in the drawings are the following figures:

FIG. 1 depicts spillover spreading in fluorescent flow cytometer data.

FIG. 3 depicts a hierarchy for phenotyping T cells by determining the positivity or negativity of cells with respect to the presence CD4 or CD8.

FIG. 5 depicts a spillover spreading matrix.

DETAILED DESCRIPTION

Figure 2B:
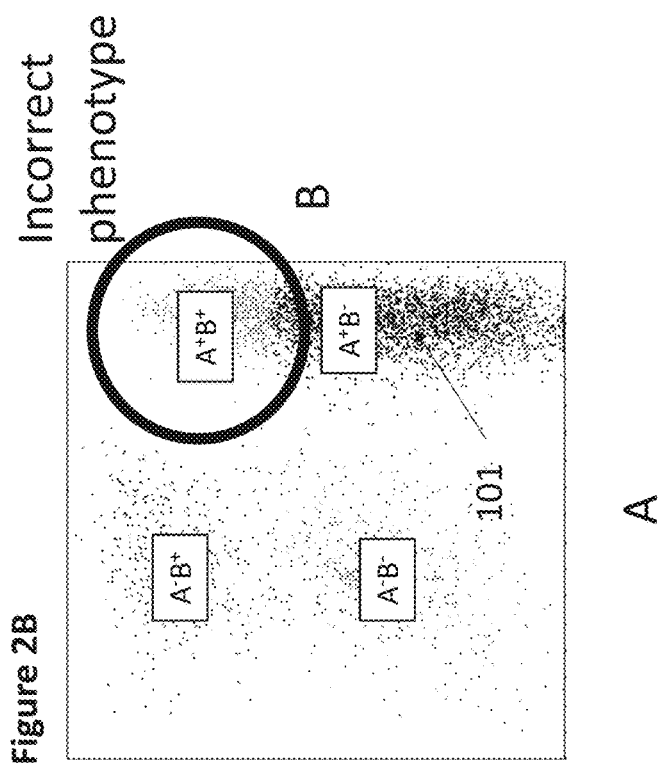
FIG. 2B depicts how spillover spreading inhibits an algorithm's ability to classify (i.e., phenotype) populations of fluorescent flow cytometer data.

Methods for classifying fluorescent flow cytometer data are provided. In some instances, methods include processing the flow cytometer data with a supervised algorithm configured to cluster the fluorescent flow cytometer data into distinct populations according to the relationship of data points to relevant threshold values. In embodiments, methods include determining a measure of spillover spreading by calculating spillover spreading coefficients and combining them in a spillover spreading matrix. In some embodiments, populations of fluorescent flow cytometer data are adjusted to subtract the magnitude of spillover spreading as determined by the spillover spreading matrix. In embodiments, spillover spreading adjusted populations are partitioned after potential partitions are evaluated relative to the threshold values. In embodiments, partitioned populations of fluorescent flow cytometer data are classified (i.e., phenotyped) according to a hierarchy. Systems and computer-readable media for classifying fluorescent flow cytometer data are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the system and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Methods for Classifying Fluorescent Flow Cytometer Data

As discussed above, aspects of the present disclosure include methods for classifying fluorescent flow cytometer data. By "fluorescent flow cytometer data" it is meant information regarding parameters of a sample (e.g., cells, particles) in a flow cell that is collected by any number of fluorescent light detectors in a particle analyzer. In embodiments, fluorescent flow cytometer data includes signals from a plurality of different fluorochromes, such as, for instance, ranging from 2 to 20 different fluorochromes, and including 3 to 5 different fluorochromes. In some embodiments, a plurality of different fluorochromes includes 2 or more different fluorochromes, including 3 or more, 4 or more, 5 or more, 6 or more, 7 or more, 8 or more, 9 or more, 10 or more, 11, or more, 12 or more, 13 or more, 14 or more 15 or more, and 20 or more different fluorochromes. Fluorescent flow cytometer data may be obtained by any convenient protocol, including those described below.

In some embodiments, methods include generating one or more population clusters based on the determined parameters (e.g., fluorescence) of analytes (e.g., cells, particles) in the sample. As used herein, a "population", or "subpopulation" of analytes, such as cells or other particles, generally refers to a group of analytes that possess properties (for example, optical, impedance, or temporal properties) with respect to one or more measured fluorescent parameters such that measured parameter data form a cluster in the data space. Thus, populations are recognized as clusters in the data. Conversely, each data cluster generally is interpreted as corresponding to a population of a particular type of cell or analyte, although clusters that correspond to noise or background typically also are observed. A cluster may be defined in a subset of the dimensions, e.g., with respect to a subset of the measured fluorescent parameters (i.e., fluorochromes), which corresponds to populations that differ in only a subset of the measured parameters or features extracted from the measurements of the sample.

Aspects of the invention include the supervised clustering of fluorescent flow cytometer data. Any convenient supervised phenotyping algorithm may be employed for this step. In some embodiments, the supervised phenotyping algorithm is the Ek' Balam algorithm. The Ek' Balam algorithm is described in Amir et al. (2019). Development of a comprehensive antibody staining database using a standardized analytics pipeline. *Frontiers in immunology*, 10, 1315; herein incorporated by reference. As such, in certain embodiments, populations of fluorescent flow cytometer data are clustered based on each data point's status relative to a hierarchy. A hierarchy as described herein defines the criteria by which fluorescent flow cytometer data is grouped into a particular population. In some embodiments, the hierarchy establishes how data points that are positive or negative for the same parameters are grouped together. For example, FIG. 3 demonstrates a hierarchy for clustering T cells by determining the positivity or negativity of the cells with respect to the presence of CD4 and CD8. A cell that is positive for CD4 but negative for CD8 is a "CD4 T Cell", while a cell that is positive for both markers is a "Double Positive T Cell", and so forth.

Figure 4:
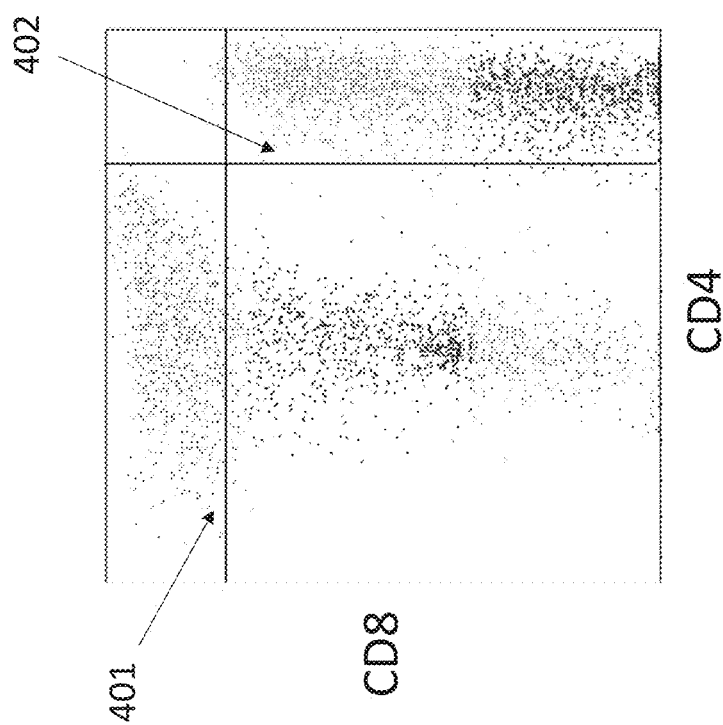
FIG. 4 depicts clustering fluorescent flow cytometer data relative to threshold values.

In some embodiments, clustering fluorescent flow cytometer data includes comparing the fluorescent flow cytometer data to a threshold. By "threshold" it is meant a value that distinguishes between positive/negative fluorescent flow cytometer data with respect to a particular fluorochrome. In other words, fluorescent flow cytometer data that lies above the threshold value may be described as positive for a particular fluorochrome, while fluorescent flow cytometer data that lies below the threshold value may be described as negative for the same fluorochrome. For example, FIG. 4 depicts how flow cytometer data is clustered according to threshold values distinguishing between positive and negative data. Threshold 401 distinguishes flow cytometer data that is positive for CD8 from flow cytometer that is negative for CD8. Similarly, threshold 402 distinguishes flow cytometer data that is positive for CD4 from flow cytometer that is negative for CD4. Clustering may be performed by any convenient method. In some embodiments, clustering is performed by the FlowSOM algorithm. FlowSOM is described in Van Lassen et al. (2015). FlowSOM: Using self-organizing maps for visualization and interpretation of cytometry data. *Cytometry Part A*, 87(7), 636-645; herein incorporated by reference. In other embodiments, clustering is performed by an algorithm selected from: SOM—described in Kohonen, "The self-organizing map," Proceedings of the IEEE (1990) 78: 1464-1480; K-means—described in Hartigan & Wong, "Algorithm AS 136: A K-Means Clustering Algorithm," Journal of the Royal Statistical Society. Series C (Applied Statistics)(1979) 28: pp. 100-108; Gaussian Mixture Models—described in Sanderson & Curtin, "An open source C++ implementation of multi-threaded Gaussian mixture models, k-means and expectation maximisation," 2017 11th International Conference on Signal Processing and Communication Systems (ICSPCS) (https://doi.org/10.1109/ICSPCS.2017.8270510); FlowGrid—as described in Ye & Ho, "Ultrafast clustering of single-cell flow cytometry data using FlowGrid," BMC Syst Biol 13, 35 (2019). https://doi.org/10.11861s12918-019-0690-2; or X-shift—described in Samusik et al., "Automated mapping of phenotype space with single-cell data," Nat Methods (2016) 13: 493-496.

After flow cytometer data is clustered, embodiments of the invention include determining a measure of spillover spreading for the populations of fluorescent flow cytometer data. As described in the Introduction section and depicted in FIG. 1 and FIG. 2A-2B, fluorescent flow cytometer data at the point of collection (i.e., the point at which it is received by one or more fluorescent light detectors) is subject to spillover spreading. Spillover is a phenomenon in which particle-modulated light indicative of a particular fluorochrome is received by one or more detectors that are not configured to measure that parameter. As such, light may "spill-over" and be detected by off-target detectors. Spillover spreading, therefore, is noise present in the fluorescent flow cytometer data caused by spillover. As such, in some embodiments, unadjusted flow cytometer data is erroneous due to the unintentional detection of certain wavelengths of light by one or more detectors. In certain embodiments, determining a measure of spillover spreading includes quantifying the extent to which fluorescent flow cytometer data collected from a first fluorochrome by a first detector is impacted by the simultaneous collection of light from a second fluorochrome by the same detector. In some instances, fluorescent flow cytometer data subject to spillover spreading is impacted by signal intensities that are higher than would otherwise be observed (i.e., the spillover spreading noise is constructive). In other instances, fluorescent flow cytometer data subject to spillover spreading is impacted by signal intensities that are lower than otherwise would be observed (i.e., the spillover spreading noise is destructive). In certain embodiments, determining a measure of spillover spreading includes calculating a spillover spreading coefficient. Spillover spreading coefficients are described in detail in Nguyen et al. (2013). Quantifying spillover spreading for comparing instrument performance and aiding in multicolor panel design. *Cytometry Part A*, 83(3), 306-315; the disclosure of which is incorporated by reference herein. In some embodiments, a spillover spreading coefficient is calculated according to Equation 1:

$$SS = \frac{\Delta \sigma_f}{\sqrt{\Delta d}} = \frac{\sqrt{(\sigma_{pos})^2 - (\sigma_{neg})^2}}{\sqrt{d_{pos} - d_{neg}}}$$

As shown in Equation 1, SS is the spillover spreading coefficient, $\Delta \sigma_f$ is an incremental standard deviation indicating the spread of the emission between the positive and negative fluorescent flow cytometer data collected from a fluorochrome, and Ad is a difference in the intensity of the fluorescent light between the positive and negative fluorescent flow cytometer data received by a fluorescent light detector. As such, the spillover spreading coefficient measures the extent to which fluorescent flow cytometer data collected by a given fluorescent light detector is impacted by the presence of light associated with a particular fluorochrome. In other words, the spillover spreading coefficient estimates the error (i.e., noise) contributed to the fluorescent flow cytometer data by light emitting from the relevant fluorochrome being collected by a given detector. In embodiments, a higher spillover spreading coefficient corresponds to more spillover spreading for a given fluorochrome-detector pair.

Figure 5:
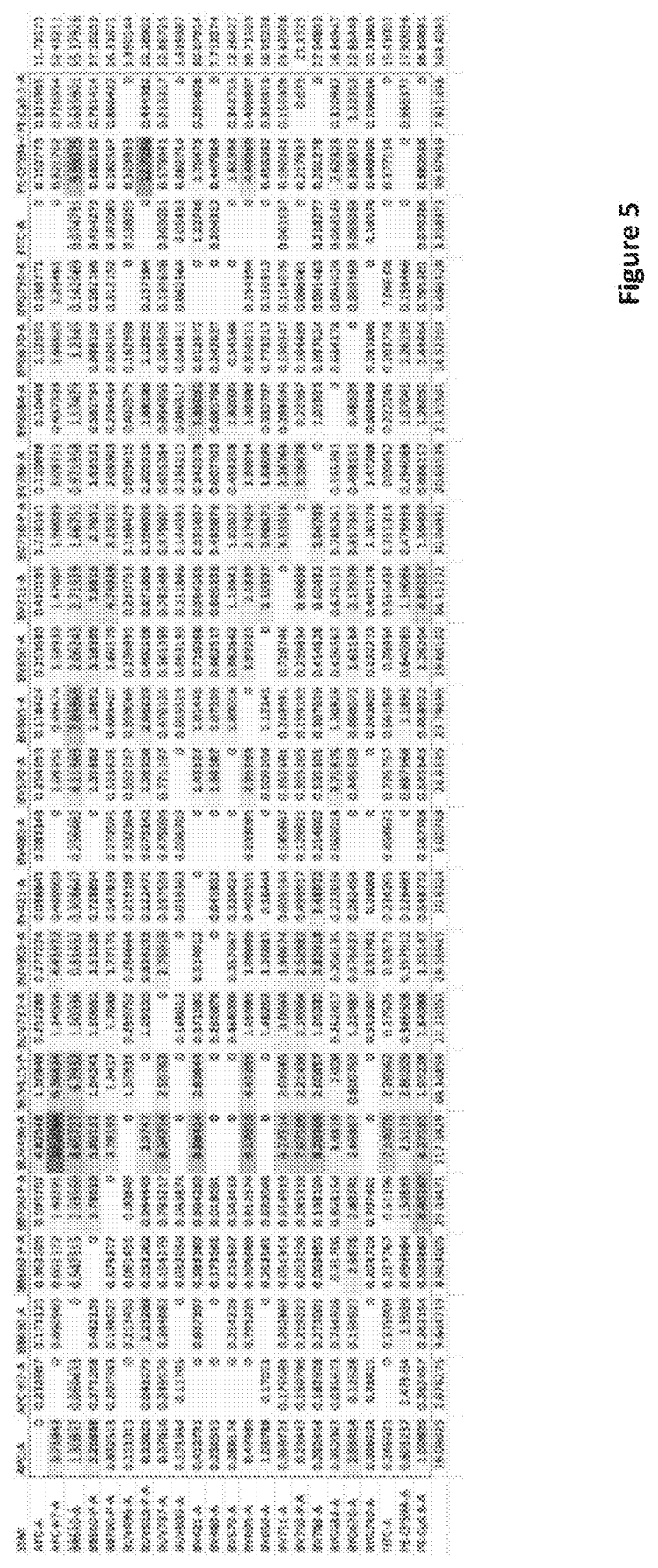

In some embodiments, determining a measure of spillover spreading also includes calculating spillover spreading coefficients for each possible fluorescent light detector-fluorochrome combination so that it can be determined how fluorescent flow cytometer data collected at each detector is affected by the presence of light associated with each fluorochrome. In embodiments, spillover spreading coefficients calculated for each fluorescent light detector-fluorochrome pair are combined in a spillover spreading matrix. In certain embodiments, the spillover spreading matrix demonstrates how the detection of a particular fluorochrome by its corresponding detector is impacted by spillover from other fluorochromes. For example, FIG. 5 presents one embodiment of a spillover spreading matrix that provides spillover spreading coefficients for 23 different fluorochromes. Each column in the matrix corresponds to a detector configured to detect one of the 23 different fluorochromes, and each row in the matrix corresponds to a parameter of flow cytometer data that is detected. The cell in which a column and row intersects is populated with a spillover spreading coefficient calculated for that fluorescent light detector-fluorochrome pair indicating the extent to which the fluorochrome in question contributes error to the relevant detector. The total degree to which a fluorochrome causes spillover spreading can be approximated by summing all the values in its row, and the total degree to which a detector is impacted by spillover spreading can be calculated by summing all the values in its column. In some embodiments, spillover spreading coefficients are summed in order to calculate the total spreading effect (i.e., the cumulative effect of spillover spreading on a particular subset of fluorescent flow cytometer data).

In some embodiments, the spillover spreading matrix is calculated by means of the AutoSpread algorithm. The AutoSpread algorithm was created by Becton Dickinson and is described U.S. Provisional Application No. 63/020,758, herein incorporated by reference, and is configured to create a spillover spreading matrix (e.g., as described above) without requiring a distinction between populations of flow cytometer that are positive and negative with respect to a given fluorochrome. AutoSpread characterizes the spread contributed to the detected signal of a first fluorochrome by the inclusion of a second fluorochrome in the same flow cytometry panel. AutoSpread produces one coefficient for each interaction between a fluorescent light detector and a fluorochrome, and arranges the coefficients into a matrix akin to the spillover spreading matrix described above. In embodiments, calculating a spillover spreading coefficient includes assuming that the intensity of fluorescent light collected by the fluorescent light detector for the negative population of flow cytometer data is zero, and the corresponding standard deviation is an unknown quantity. In some embodiments, the spillover spreading coefficient is calculated according to Equation 2:

$$SS = \frac{\sqrt{\sigma^2 - \sigma_0^2}}{\sqrt{d}}$$

As shown in Equation 2, SS is the spillover spreading coefficient, $\sigma^2$ is the standard deviation of the positive population of fluorescent flow cytometer data, $\sigma_0^2$ is an estimate of the standard deviation of the negative population of fluorescent flow cytometer data, and d is the intensity of light collected by a fluorescent light detector. In some embodiments, in order to obtain an estimate of the standard deviation of the negative population of fluorescent flow cytometer data ($\sigma_0^2$) when the intensity of fluorescent light collected by the fluorescent light detector for the negative population of flow cytometer data is assumed to be zero, the spillover spreading coefficient is calculated following a sequence of linear regressions. Fluorescent flow cytometer data is first sorted into quantiles according to intensity values that are detected by the fluorescent light detector. The number of quantiles is by default 256, but is adjusted downwards to as few as 8 to ensure that each quantile has a sufficient number of data points to allow for reliable estimation of standard deviations. Next, the robust standard deviation of the light emitted from the fluorochrome is regressed against the square root of the median intensity of light detected for each quantile. The y-intercept of the ordinary least squares fit is taken as the estimate of the standard deviation in the negative population of flow cytometer data when the intensity of light detected for the negative population is assumed to be zero. The estimate of the standard deviation of light emitted from the fluorochrome is used to obtain new zero-adjusted standard deviations. The zero-adjusted standard deviation for the fluorochrome is regressed against the square root of the median fluorescence of each quantile detected by the fluorescent light detector. The slope of the ordinary least squares fit (calculated by Equation 2) is taken as the spillover spreading coefficient.

Figure 6:
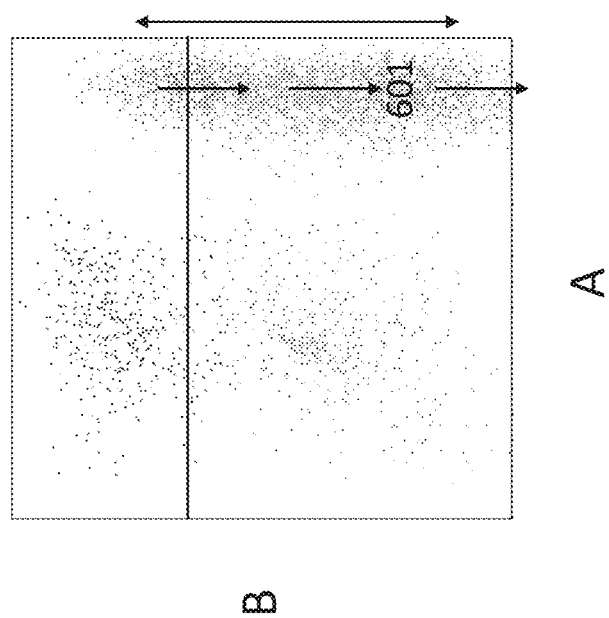
FIG. 6 depicts the process of adjusting a population of flow cytometer data based on spillover spreading.
Figure 7B:
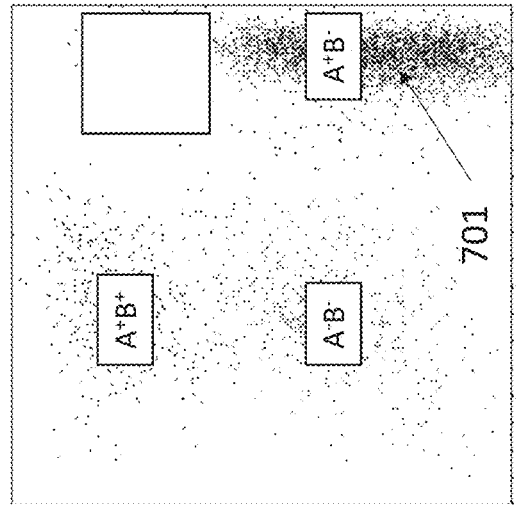
FIG. 7B depicts classifying (i.e., phenotyping) flow cytometer data that has been adjusted based on spillover spreading.
Figure 7A:
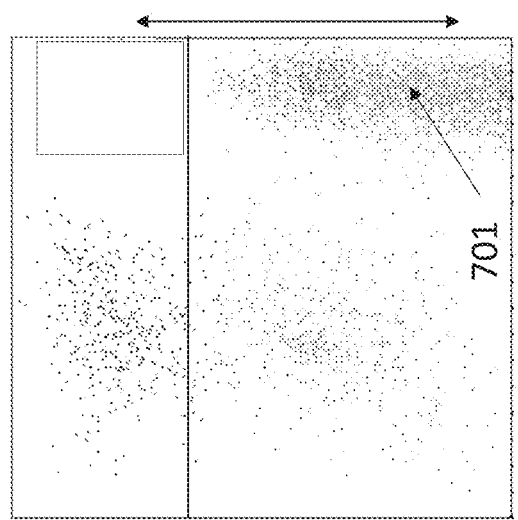
FIG. 7A depicts flow cytometer data that has been adjusted based on spillover spreading.

Aspects of the present disclosure further include adjusting fluorescent flow cytometer data to account for spillover spreading. By "adjusting" it is meant altering the data such that it more accurately quantifies the presence of fluorochromes in the sample (e.g., cells, particles) being irradiated in the flow cell. In some embodiments, fluorescent flow cytometer data is adjusted to remove substantially all constructive error resulting from spillover spreading. In embodiments, adjusting fluorescent flow cytometer data includes generating distinct spillover spreading adjusted populations. In certain embodiments, generating distinct spillover spreading adjusted populations includes subtracting the magnitude of the spillover spreading from the relevant population(s) of flow cytometer data, i.e., to counteract the constructive effects of signals being impacted by spillover spreading. In certain embodiments, the magnitude of spillover spreading is determined from the spillover spreading matrix. In some embodiments, adjusting flow cytometer data includes subtracting the total spreading effect from the relevant portion of the flow cytometer data. For example, FIG. 6 demonstrates the adjustment of flow cytometer data such that spillover spreading is accounted for. Arrows 601 indicates how the median of the population cluster is being shifted downwards. In other words, the magnitude of spillover spreading is being subtracted from the datapoints within the population cluster, thereby altering the position of the cluster relative to other population clusters. FIG. 7A depicts flow cytometer data that has been adjusted by the above-described process. In some embodiments, fluorescent flow cytometer data is adjusted by calculating the likelihood that each cell falls above a threshold according to all known sources of noise, including spillover spreading.

After populations of fluorescent flow cytometer data have been adjusted for spillover spreading (e.g., as described above), aspects of the present invention further include partitioning the spillover spreading adjusted populations of fluorescent flow cytometer data. By "partitioning" it is meant delineating between populations of flow cytometer data that are determined to be separate based on their positivity or negativity with respect to the plurality of different fluorochromes. In other words, partitions are created to formally distinguish between populations of fluorescent flow cytometer data that are to be classified differently (e.g., represent different phenotypes).

In embodiments, partitioning distinct spillover spreading adjusted populations of flow cytometer data includes calculating Matthew's correlation coefficient (MCC). This coefficient is a measure of quality for binary classifications, and provides a quantification of how well a given threshold accurately distinguishes between positive and negative groups of flow cytometer data. Matthew's correlation coefficient is described in Matthews, B. W. (1975). Comparison of the predicted and observed secondary structure of T4 phage lysozyme. *Biochimica et Biophysica Acta (BBA)-Protein Structure*, 405(2), 442-451; the disclosure of which is incorporated by reference. In embodiments, potential partitions between distinct spillover spreading adjusted populations of fluorescent flow cytometer data are evaluated with respect to each of the threshold values. In such embodiments, Matthew's correlation coefficient is calculated for each of the threshold values, thereby assessing the level of agreement between the threshold and the partition. Embodiments of the invention therefore involve partitioning the populations such that Matthew's correlation coefficient is optimized with respect to the relevant thresholds distinguishing between positive and negative populations of flow cytometer data with respect to a particular fluorochrome. In other words, partitioning fluorescent flow cytometer data includes maximizing the extent to which separate populations (i.e., populations that exhibit different combinations of fluorescent parameters) are distinguished from each other as determined by their relationship to relevant thresholds (e.g., quantified by Matthew's correlation coefficient). In embodiments, this process is iterated to determine optimal partitions distinguishing between positive and negative populations for each relevant parameter of flow cytometer data. In embodiments, Matthew's correlation coefficient is calculated according to Equation 3:

$$MCC = \frac{TP \times TN - FP \times FN}{\sqrt{(TP+FP)(TP+FN)(TN+FP)(TN+FN)}}$$

As shown in Equation 3, MCC is Matthew's correlation coefficient, TP represents true positive events, TN represents true negative events, FP represents false positive events and FN represents false negative events. According to the present disclosure, true positive events are fluorescent flow cytometer data that are assessed to be positive for a particular fluorochrome by both the threshold and the partition, true negative events are fluorescent flow cytometer data that are assessed to be negative for a particular fluorochrome by both the threshold and the partition, false positive events are fluorescent flow cytometer data that are assessed to be positive for a particular fluorochrome by the partition and negative by the threshold, and false negative events are flow cytometer data that are assessed to be negative for a particular fluorochrome by the partition and positive by the threshold.

In some embodiments of the invention, fluorescent flow cytometer data does not contain signals that are positive for a particular fluorochrome. In other words, fluorescent light emitting from the fluorochrome is not detected. In such embodiments, partitioning the distinct spillover spreading adjusted fluorescent flow cytometer data may comprise calculating the balanced accuracy of each partition as an alternative metric for determining the optimal partition. Balanced accuracy is the average of the accuracy of determining positive events and the accuracy of determining negative events and is calculated according to Equation 4:

$$BA = \frac{\left(\frac{TP}{TP+FN}\right) + \left(\frac{TN}{TN+FP}\right)}{2}$$

As shown in Equation 4, BA is balanced accuracy, TP represents true positive events, TN represents true negative events, FP represents false positive events and FN represents false negative events.

Figure 2A:
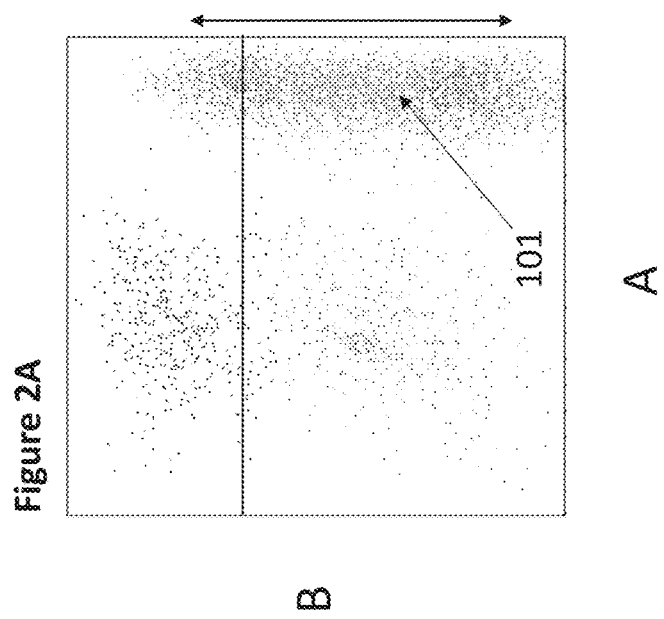
FIG. 2A depicts how spillover spreading inhibits an algorithm's ability to correctly distinguish between distinct population clusters of fluorescent flow cytometer data.

Embodiments of the invention also include classifying the partitioned populations of fluorescent flow cytometer data, i.e., determining the subtype of cells or particles designated by each distinct spillover spreading adjusted population of flow cytometer data. In embodiments, classifications are determined based on the hierarchy (described above). As such, a population of fluorescent flow cytometer data that has been partitioned (e.g., as described above) is assigned a classification (i.e., phenotyped) based on the combination of fluorescent parameters it exhibits. For example, FIG. 7B depicts how the spillover spreading adjusted fluorescent flow cytometer data depicted in FIG. 7A is partitioned such that distinct population clusters are correctly assigned to their respective phenotypes. As shown in FIG. 2B, discussed in the Introduction section, a portion of a population cluster 101 is assigned the incorrect phenotype absent any data adjustment. However, after the population is adjusted (arrows 601) for spillover spreading (e.g., as shown in FIG. 6), the entirety of population 701 is assigned the correct phenotype (i.e., $A^+B^-$), as opposed to only part of population 701 being assigned the correct phenotype.

As summarized above, the fluorescent data employed in methods of the invention may be obtained using any convenient protocol. In some embodiments, a sample having particles is irradiated with a light source and light from the sample is detected to generate populations of related particles based at least in part on the measurements of the detected light. In some instances, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

In practicing the subject methods, a sample having particles (e.g., in a flow stream of a flow cytometer) is irradiated with light from a light source. In some embodiments, the light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Where methods include irradiating with a broadband light source, broadband light source protocols of interest may include, but are not limited to, a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof.

In other embodiments, methods include irradiating with a narrow band light source emitting a particular wavelength or a narrow range of wavelengths, such as for example with a light source which emits light in a narrow range of wavelengths like a range of 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Where methods include irradiating with a narrow band light source, narrow band light source protocols of interest may include, but are not limited to, a narrow wavelength LED, laser diode or a broadband light source coupled to one or more optical bandpass filters, diffraction gratings, monochromators or any combination thereof.

Aspects of the present invention include collecting fluorescent light with a fluorescent light detector. A fluorescent light detector may, in some instances, be configured to detect fluorescence emissions from fluorescent molecules, e.g., labeled specific binding members (such as labeled antibodies that specifically bind to markers of interest) associated with the particle in the flow cell. In certain embodiments, methods include detecting fluorescence from the sample with one or more fluorescent light detectors, such as 2 or more, such as 3 or more, such as 4 or more, such as 5 or more, such as 6 or more, such as 7 or more, such as 8 or more, such as 9 or more, such as 10 or more, such as 15 or more and including 25 or more fluorescent light detectors. In embodiments, each of the fluorescent light detectors is configured to generate a fluorescence data signal. Fluorescence from the sample may be detected by each fluorescent light detector, independently, over one or more of the wavelength ranges of 200 nm-1200 nm. In some instances, methods include detecting fluorescence from the sample over a range of wavelengths, such as from 200 nm to 1200 nm, such as from 300 nm to 1100 nm, such as from 400 nm to 1000 nm, such as from 500 nm to 900 nm and including from 600 nm to 800 nm. In other instances, methods include detecting fluorescence with each fluorescence detector at one or more specific wavelengths. For example, the fluorescence may be detected at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof, depending on the number of different fluorescent light detectors in the subject light detection system. In certain embodiments, methods include detecting wavelengths of light which correspond to the fluorescence peak wavelength of certain fluorochromes present in the sample. In embodiments, fluorescent flow cytometer data is received from one or more fluorescent light detectors (e.g., one or more detection channels), such as 2 or more, such as 3 or more, such as 4 or more, such as 5 or more, such as 6 or more and including 8 or more fluorescent light detectors (e.g., 8 or more detection channels).

Systems for Classifying Fluorescent Flow Cytometer Data

Aspects of the present disclosure include systems for classifying fluorescent flow cytometer data. In embodiments, fluorescent flow cytometer data is clustered, adjusted for spillover spreading, and partitioned so that separate populations are classified differently. In some embodiments, systems include a particle analyzer configured to produce fluorescent flow cytometer data, and a processor configured to analyze the fluorescent flow cytometer data.

In some embodiments, the subject particle analyzers have a flow cell, and a laser configured to irradiate particles in the flow cell. In embodiments, the laser may be any convenient laser, such as a continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject flow cytometers include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject flow cytometers include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

Aspects of the invention also include a forward scatter detector configured to detect forward scattered light. The number of forward scatter detectors in the subject flow cytometers may vary, as desired. For example, the subject particle analyzers may include 1 forward scatter detector or multiple forward scatter detectors, such as 2 or more, such as 3 or more, such as 4 or more, and including 5 or more. In certain embodiments, flow cytometers include 1 forward scatter detector. In other embodiments, flow cytometers include 2 forward scatter detectors.

Any convenient detector for detecting collected light may be used in the forward scatter detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 cm$^2$ to 10 cm$^2$, such as from 0.05 cm$^2$ to 9 cm$^2$, such as from, such as from 0.1 cm$^2$ to 8 cm$^2$, such as from 0.5 cm$^2$ to 7 cm$^2$ and including from 1 cm$^2$ to 5 cm$^2$.

Where the subject particle analyzers include multiple forward scatter detectors, each detector may be the same, or the collection of detectors may be a combination of different types of detectors. For example, where the subject particle analyzers include two forward scatter detectors, in some embodiments the first forward scatter detector is a CCD-type device and the second forward scatter detector (or imaging sensor) is a CMOS-type device. In other embodiments, both the first and second forward scatter detectors are CCD-type devices. In yet other embodiments, both the first and second forward scatter detectors are CMOS-type devices. In still other embodiments, the first forward scatter detector is a CCD-type device and the second forward scatter detector is a photomultiplier tube (PMT). In still other embodiments, the first forward scatter detector is a CMOS-type device and the second forward scatter detector is a photomultiplier tube. In yet other embodiments, both the first and second forward scatter detectors are photomultiplier tubes.

In embodiments, the forward scatter detector is configured to measure light continuously or in discrete intervals. In some instances, detectors of interest are configured to take measurements of the collected light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Embodiments of the invention also include a light dispersion/separator module positioned between the flow cell and the forward scatter detector. Light dispersion devices of interest include but are not limited to, colored glass, bandpass filters, interference filters, dichroic mirrors, diffraction gratings, monochromators and combinations thereof, among other wavelength separating devices. In some embodiments, a bandpass filter is positioned between the flow cell and the forward scatter detector. In other embodiments, more than one bandpass filter is positioned between the flow cell and the forward scatter detector, such as, for example, 2 or more, 3 or more, 4 or more, and including 5 or more. In embodiments, the bandpass filters have a minimum bandwidth ranging from 2 nm to 100 nm, such as from 3 nm to 95 nm, such as from 5 nm to 95 nm, such as from 10 nm to 90 nm, such as from 12 nm to 85 nm, such as from 15 nm to 80 nm and including bandpass filters having minimum bandwidths ranging from 20 nm to 50 nm. wavelengths and reflects light with other wavelengths to the forward scatter detector.

Certain embodiments of the invention include a side scatter detector configured to detect side scatter wavelengths of light (e.g., light refracted and reflected from the surfaces and internal structures of the particle). In other embodiments, flow cytometers include multiple side scatter detectors, such as 2 or more, such as 3 or more, such as 4 or more, and including 5 or more.

Any convenient detector for detecting collected light may be used in the side scatter detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

Where the subject particle analyzers include multiple side scatter detectors, each side scatter detector may be the same, or the collection of side scatter detectors may be a combination of different types of detectors. For example, where the subject particle analyzers include two side scatter detectors, in some embodiments the first side scatter detector is a CCD-type device and the second side scatter detector (or imaging sensor) is a CMOS-type device. In other embodiments, both the first and second side scatter detectors are CCD-type devices. In yet other embodiments, both the first and second side scatter detectors are CMOS-type devices. In still other embodiments, the first side scatter detector is a CCD-type device and the second side scatter detector is a photomultiplier tube (PMT). In still other embodiments, the first side scatter detector is a CMOS-type device and the second side scatter detector is a photomultiplier tube. In yet other embodiments, both the first and second side scatter detectors are photomultiplier tubes.

Embodiments of the invention also include a light dispersion/separator module positioned between the flow cell and the side scatter detector. Light dispersion devices of interest include but are not limited to, colored glass, bandpass filters, interference filters, dichroic mirrors, diffraction gratings, monochromators and combinations thereof, among other wavelength separating devices.

In embodiments, the subject particle analyzers also include a fluorescent light detector configured to detect one or more fluorescent wavelengths of light. In other embodiments, particle analyzers include multiple fluorescent light detectors such as 2 or more, such as 3 or more, such as 4 or more, 5 or more, 10 or more, 15 or more, and including 20 or more.

Any convenient detector for detecting collected light may be used in the fluorescent light detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

Where the subject particle analyzers include multiple fluorescent light detectors, each fluorescent light detector may be the same, or the collection of fluorescent light detectors may be a combination of different types of detectors. For example, where the subject particle analyzers include two fluorescent light detectors, in some embodiments the first fluorescent light detector is a CCD-type device and the second fluorescent light detector (or imaging sensor) is a CMOS-type device. In other embodiments, both the first and second fluorescent light detectors are CCD-type devices. In yet other embodiments, both the first and second fluorescent light detectors are CMOS-type devices. In still other embodiments, the first fluorescent light detector is a CCD-type device and the second fluorescent light detector is a photomultiplier tube (PMT). In still other embodiments, the first fluorescent light detector is a CMOS-type device and the second fluorescent light detector is a photomultiplier tube. In yet other embodiments, both the first and second fluorescent light detectors are photomultiplier tubes.

Embodiments of the invention also include a light dispersion/separator module positioned between the flow cell and the fluorescent light detector. Light dispersion devices of interest include but are not limited to, colored glass, bandpass filters, interference filters, dichroic mirrors, diffraction gratings, monochromators and combinations thereof, among other wavelength separating devices.

In embodiments of the present disclosure, fluorescent light detectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths. In some embodiments, 2 or more detectors in a flow cytometer as described herein are configured to measure the same or overlapping wavelengths of collected light.

In some embodiments, fluorescent light detectors of interest are configured to measure collected light over a range of wavelengths (e.g., 200 nm-1000 nm). In certain embodiments, detectors of interest are configured to collect spectra of light over a range of wavelengths. For example, particle analyzers may include one or more detectors configured to collect spectra of light over one or more of the wavelength ranges of 200 nm-1000 nm. In yet other embodiments, detectors of interest are configured to measure light emitted by a sample in the flow stream at one or more specific wavelengths. For example, particle analyzers may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, one or more detectors may be configured to be paired with specific fluorophores, such as those used with the sample in a fluorescence assay.

Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem.* January; 49(pt 1):17-28; Linden, et. al., *Semin Throm Hemost.* 2004 October; 30(5): 502-11; Alison, et al. *J Pathol*, 2010 December; 222(4):335-344; and Herbig, et al. (2007) *Crit Rev Ther Drug Carrier Syst.* 24(3):203-255; the disclosures of which are incorporated herein by reference. In certain instances, flow cytometry systems of interest include BD Biosciences FACSCanto™ flow cytometer, BD Biosciences FACSCanto™ II flow cytometer, BD Accuri™ flow cytometer, BD Accuri™ C6 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer, BD Biosciences LSRFortessa™ flow cytometer, BD Biosciences LSRFortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter, BD Biosciences Via™ cell sorter, BD Biosciences Influx™ cell sorter, BD Biosciences Jazz™ cell sorter, BD Biosciences Aria™ cell sorter, BD Biosciences FACSAria™ II cell sorter, BD Biosciences FACSAria™ III cell sorter, BD Biosciences FACSAria™ Fusion cell sorter and BD Biosciences FACSMelody™ cell sorter, BD Biosciences FACSymphony™ S6 cell sorter or the like.

In some embodiments, the subject systems are flow cytometric systems, such those described in U.S. Pat. Nos. 10,663,476; 10,620,111; 10,613,017; 10,605,713; 10,585,031; 10,578,542; 10,578,469; 10,481,074; 10,302,545; 10,145,793; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; 4,987,086; 4,498,766; the disclosures of which are herein incorporated by reference in their entirety.

In certain instances, flow cytometry systems of the invention are configured for imaging particles in a flow stream by fluorescence imaging using radiofrequency tagged emission (FIRE), such as those described in Diebold, et al. Nature Photonics Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

In certain embodiments, the subject systems additionally include a processor having memory operably coupled to the processor wherein the memory includes instructions stored thereon, which when executed by the processor, cause the processor to cluster fluorescent flow cytometer data, determine a measure of spillover spreading, adjust the fluorescent flow cytometer data for spillover spreading, and partition the spillover spreading adjusted fluorescent flow cytometer data.

In some embodiments, the processor is configured to generate one or more population clusters based on the determined parameters of analytes (e.g., cells, particles) in the sample. In embodiments, fluorescent flow cytometer data includes signals from a plurality of different fluorochromes, such as, for instance, ranging from 2 to 20 different fluorochromes, and including 3 to 5 different fluorochromes. In some embodiments, a plurality of different fluorochromes includes 2 or more different fluorochromes, including 3 or more, 4 or more, 5 or more, 6 or more, 7 or more, 8 or more, 9 or more, 10 or more, 11, or more, 12 or more, 13 or more, 14 or more 15 or more, and including 20 or more different fluorochromes. Thus, populations are recognized as clusters in the data. Conversely, each data cluster generally is interpreted as corresponding to a population of a particular type of cell or analyte, although clusters that correspond to noise or background typically also are observed. A cluster may be defined in a subset of the dimensions, e.g., with respect to a subset of the measured fluorescent parameters (i.e., fluorochromes), which corresponds to populations that differ in only a subset of the measured parameters or features extracted from the measurements of the sample.

In embodiments, the processor contains instructions for performing the supervised clustering of fluorescent flow cytometer data. As such, in certain embodiments, populations of fluorescent flow cytometer data are clustered based on each data point's status relative to a hierarchy. In some embodiments, the hierarchy establishes the manner in which data points that are positive or negative for the same fluorochromes are grouped together. In some embodiments, clustering fluorescent flow cytometer data includes comparing the fluorescent flow cytometer data to a threshold. In other words, fluorescent flow cytometer data that lies above the threshold value may be described as positive for a particular fluorochrome, while fluorescent flow cytometer data that lies below the threshold value may be described as negative for the same fluorochrome.

After flow cytometer data is clustered, the processor may be configured to determine a measure of spillover spreading for the populations of fluorescent flow cytometer data. In some embodiments, unadjusted flow cytometer data contains noise (i.e., spillover spreading) due to the unintentional detection of certain wavelengths of light by one or more detectors. In certain embodiments, determining a measure of spillover spreading includes quantifying the extent to which the intensity of light collected from a first fluorochrome by a first detector is impacted by the simultaneous collection of light from a second fluorochrome by the same detector. In certain embodiments, determining a measure of spillover spreading includes calculating a spillover spreading coefficient. In some embodiments, the spillover spreading coefficient is calculated according to Equation 1:

$$SS = \frac{\Delta \sigma_f}{\sqrt{\Delta d}} = \frac{\sqrt{(\sigma_{pos})^2 - (\sigma_{neg})^2}}{\sqrt{d_{pos} - d_{neg}}}$$

As shown in Equation 1, SS is the spillover spreading coefficient, $\Delta\sigma_f$ is an incremental standard deviation indicating the spread of the emission between the positive and negative fluorescent flow cytometer data collected from a fluorochrome, and $\Delta d$ is a difference in the intensity of the fluorescent light between the positive and negative fluorescent flow cytometer data received by a fluorescent light detector. As such, the spillover spreading coefficient measures the extent to which fluorescent flow cytometer data collected by a given fluorescent light detector is impacted by the presence of light associated with a particular fluorochrome. In other words, the spillover spreading coefficient estimates the error (i.e., noise) contributed to the fluorescent flow cytometer data by light emitting from the relevant fluorochrome being collected by a given detector. In embodiments, a higher spillover spreading coefficient corresponds to more spillover spreading for a given fluorochrome-detector pair.

In some embodiments, determining a measure of spillover spreading also includes calculating spillover spreading coefficients for each possible fluorescent light detector-fluorochrome combination so that it can be determined how fluorescent flow cytometer data collected at each detector is affected by the presence of light associated with each fluorochrome. In embodiments, spillover spreading coefficients calculated for each fluorescent light detector-fluorochrome pair are combined in a spillover spreading matrix. In certain embodiments, the spillover spreading matrix demonstrates how the detection of a particular fluorochrome by its corresponding detector is impacted by spillover from other fluorochromes. The cell in which a column and row intersects is populated with a spillover spreading coefficient calculated for that fluorescent light detector-fluorochrome pair indicating the extent to which the fluorochrome in question contributes error at the relevant detector. The total degree to which a fluorochrome causes spillover spreading can be approximated by summing all the values in its row, and the total degree to which a detector is impacted by spillover spreading can be calculated by summing all the values in its column. In some embodiments, spillover spreading coefficients are summed in order to calculate the total spreading effect (i.e., the cumulative effect of spillover spreading on a particular subset of fluorescent flow cytometer data).

In some embodiments, the spillover spreading matrix is calculated by means of the AutoSpread algorithm. The AutoSpread algorithm is configured to create a spillover spreading matrix (e.g., as described above) without requiring a distinction between populations of flow cytometer that are positive and negative with respect to a given fluorochrome. AutoSpread characterizes the spread contributed to the detected signal of a first fluorochrome by the inclusion of a second fluorochrome in the same flow cytometry panel. AutoSpread produces one coefficient for each interaction between a fluorescent light detector and a fluorochrome, and arranges the coefficients into a matrix akin to the Spillover spreading matrix described above. In embodiments, calculating a spillover spreading coefficient includes assuming that the intensity of fluorescent light collected by the fluorescent light detector for the negative population of flow cytometer data is zero, and the corresponding standard deviation is an unknown quantity. In some embodiments, the spillover spreading coefficient is calculated according to Equation 2:

$$SS = \frac{\sqrt{\sigma^2 - \sigma_0^2}}{\sqrt{d}}$$

As shown in Equation 2, SS is the spillover spreading coefficient, $\sigma^2$ is the standard deviation of the positive population of fluorescent flow cytometer data, $\sigma_0^2$ is an estimate of the standard deviation of the negative population of fluorescent flow cytometer data, and d is the intensity of light collected by a fluorescent light detector. In some embodiments, in order to obtain an estimate of the standard deviation of the negative population of fluorescent flow cytometer data ($\sigma_0^2$) when the intensity of fluorescent light collected by the fluorescent light detector for the negative population of flow cytometer data is assumed to be zero, the spillover spreading coefficient is calculated following a sequence of linear regressions. Fluorescent flow cytometer data is first sorted into quantiles according to intensity values that are detected by the fluorescent light detector. The number of quantiles is by default 256, but is adjusted downwards to as few as 8 to ensure that each quantile has a sufficient number of data points to allow for reliable estimation of standard deviations. Next, the robust standard deviation of the light emitted from the fluorochrome is regressed against the square root of the median intensity of light detected for each quantile. The y-intercept of the ordinary least squares fit is taken as the estimate of the standard deviation in the negative population of flow cytometer data when the intensity of light detected for the negative population is assumed to be zero. The estimate of the standard deviation of light emitted from the fluorochrome is used to obtain new zero-adjusted standard deviations. The zero-adjusted standard deviation for the fluorochrome is regressed against the square root of the median fluorescence of each quantile detected by the fluorescent light detector. The slope of the ordinary least squares fit (calculated by Equation 2) is taken as the spillover spreading coefficient.

In some embodiments, the processor is configured to adjust fluorescent flow cytometer data to account for spillover spreading. In some embodiments, flow cytometer data is adjusted to eliminate constructive error from spillover spreading. In embodiments, adjusting fluorescent flow cytometer data includes generating distinct spillover spreading adjusted populations. In certain embodiments, generating distinct spillover spreading adjusted populations includes subtracting the magnitude of the spillover spreading from the relevant population(s) of flow cytometer data, i.e., to counteract the effects of signals being increased due to constructive spillover spreading error. In certain embodiments, the magnitude of spillover spreading is determined from the spillover spreading matrix. In some embodiments, adjusting flow cytometer data includes subtracting the total spreading effect from the relevant portion of the flow cytometer data.

After populations of fluorescent flow cytometer data have been adjusted for spillover spreading (e.g., as described above), the processor may be configured to partition the spillover spreading adjusted populations of fluorescent flow cytometer data. Partitions are created to formally distinguish between populations of fluorescent flow cytometer data that are to be classified differently (e.g., represent different phenotypes). In embodiments, partitioning distinct spillover spreading adjusted populations of flow cytometer data includes calculating Matthew's correlation coefficient. In embodiments, potential partitions between distinct spillover spreading adjusted populations of fluorescent flow cytometer data are evaluated with respect to each of the threshold values. In such embodiments, Matthew's correlation coefficient is calculated for each of the threshold values, thereby assessing the level of agreement between the threshold and the partition. Embodiments of the invention therefore involve partitioning the populations such that Matthew's correlation coefficient is optimized with respect to the relevant thresholds distinguishing between positive and negative populations of flow cytometer data with respect to a particular fluorochrome. In other words, partitioning fluorescent flow cytometer data includes maximizing the extent to which separate populations (i.e., populations that exhibit different combinations of fluorescent parameters) are distinguished from each other as determined by their relationship to relevant thresholds (e.g., quantified by Matthew's correlation coefficient). In embodiments, the processor iterates this process to determine optimal partitions distinguishing between positive and negative populations for each relevant parameter of flow cytometer data. In embodiments, Matthew's correlation coefficient is calculated according to Equation 3:

$$MCC = \frac{TP \times TN - FP \times FN}{\sqrt{(TP+FP)(TP+FN)(TN+FP)(TN+FN)}}$$

As shown in Equation 3, MCC is Matthew's correlation coefficient, TP represents true positive events, TN represents true negative events, FP represents false positive events and FN represents false negative events. According to the present disclosure, true positive events are fluorescent flow cytometer data that are assessed to be positive for a particular fluorochrome by both the threshold and the partition, true negative events are fluorescent flow cytometer data that are assessed to be negative for a particular fluorochrome by both the threshold and the partition, false positive events are fluorescent flow cytometer data that are assessed to be positive for a particular fluorochrome by the partition and negative by the threshold, and false negative events are flow cytometer data that are assessed to be negative for a particular fluorochrome by the partition and positive by the threshold.

In some embodiments of the invention, fluorescent flow cytometer data does not contain signals that are positive for a particular fluorochrome. In other words, fluorescent light emitting from the fluorochrome is not detected. In such embodiments, partitioning the distinct populations of spillover spreading adjusted fluorescent flow cytometer data may comprise calculating the balanced accuracy of each partition as an alternative metric for determining the optimal partition. Balanced accuracy is the average of the accuracy of determining positive events and the accuracy of determining negative events and is calculated according to Equation 4:

$$BA = \frac{\left(\frac{TP}{TP+FN}\right) + \left(\frac{TN}{TN+FP}\right)}{2}$$

As shown in Equation 4, BA is balanced accuracy, TP represents true positive events, TN represents true negative events, FP represents false positive events and FN represents false negative events.

Embodiments of the invention also include classifying the partitioned populations of fluorescent flow cytometer data, i.e., determining the subtype of cells or particles designated by each distinct spillover spreading adjusted population of flow cytometer data. In embodiments, classifications are determined based on the hierarchy (described above). As such, a population of fluorescent flow cytometer data that has been partitioned (e.g., as described above) is assigned a classification (i.e., phenotyped) based on the combination of fluorescent parameters it exhibits.

Figure 8:
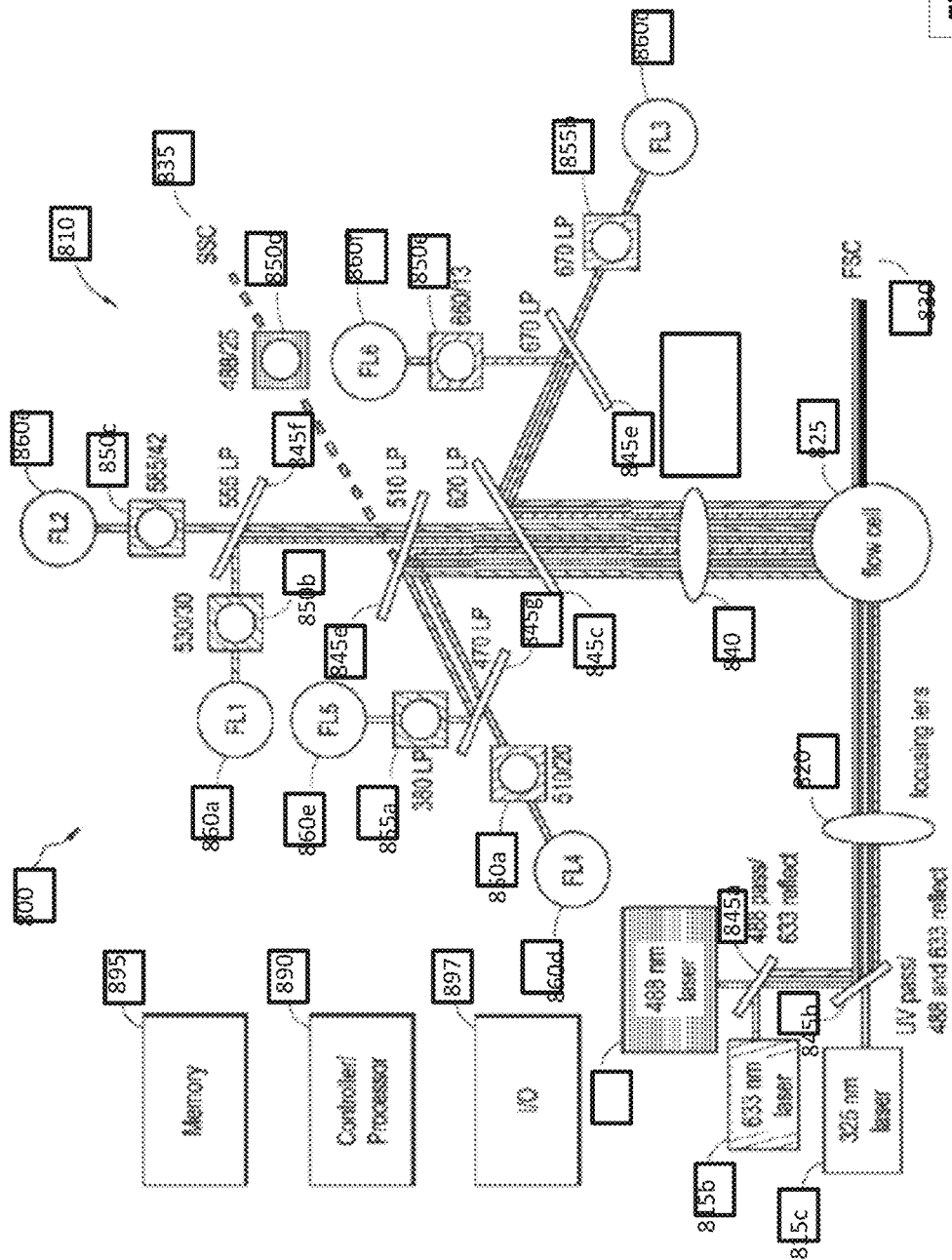
FIG. 8 depicts a flow cytometer according to certain embodiments.

FIG. 8 shows a system 800 for flow cytometry in accordance with an illustrative embodiment of the present invention. The system 800 includes a flow cytometer 810, a controller/processor 890 and a memory 895. The flow cytometer 810 includes one or more excitation lasers 815a-815c, a focusing lens 820, a flow chamber 825, a forward scatter detector 830, a side scatter detector 835, a fluorescence collection lens 840, one or more beam splitters 845a-845g, one or more bandpass filters 850a-850e, one or more longpass ("LP") filters 855a-855b, and one or more fluorescent light detectors 860a-860f.

The excitation lasers 815a-c emit light in the form of a laser beam. The wavelengths of the laser beams emitted from excitation lasers 815a-815c are 488 nm, 633 nm, and 325 nm, respectively, in the example system of FIG. 8. The laser beams are first directed through one or more beam splitters 845a and 845b. Beam splitter 845a transmits light at 488 nm and reflects light at 633 nm. Beam splitter 845b transmits UV light (light with a wavelength in the range of 10 to 400 nm) and reflects light at 488 nm and 633 nm.

The laser beams are then directed to a focusing lens 820, which focuses the beams onto the portion of a fluid stream where particles of a sample are located, within the flow chamber 825. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward scatter detector 830, side scatter detector 835, and the one or more fluorescent light detectors 860a-860f through one or more of the beam splitters 845a-845g, the bandpass filters 850a-850e, the longpass filters 855a-855b, and the fluorescence collection lens 840.

The fluorescence collection lens 840 collects light emitted from the particle-laser beam interaction and routes that light towards one or more beam splitters and filters. Bandpass filters, such as bandpass filters 850a-850e, allow a narrow range of wavelengths to pass through the filter. For example, bandpass filter 850a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 855a-855b, transmit wavelengths of light equal to or longer than a specified wavelength of light. For example, longpass filter 855a, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, beam splitter 805g is a 620 SP beam splitter, meaning that the beam splitter 845g transmits wavelengths of light that are 620 nm or shorter and reflects wavelengths of light that are longer than 620 nm in a different direction. In one embodiment, the beam splitters 845a-845g can comprise optical mirrors, such as dichroic mirrors.

The forward scatter detector 830 is positioned off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 835 is configured to detect refracted and reflected light from the surfaces and internal structures of the particle, and tends to increase with increasing particle complexity of structure. The fluorescence emissions from fluorescent molecules associated with the particle can be detected by the one or more fluorescent light detectors 860a-860f. The side scatter detector 835 and fluorescent light detectors can include photomultiplier tubes. The signals detected at the forward scatter detector 830, the side scatter detector 835 and the fluorescent detectors can be converted to electronic signals (voltages) by the detectors. This data can provide information about the sample.

In operation, cytometer operation is controlled by a controller/processor 890, and the measurement data from the detectors can be stored in the memory 895 and processed by the controller/processor 890. Although not shown explicitly, the controller/processor 890 is coupled to the detectors to receive the output signals therefrom, and may also be coupled to electrical and electromechanical components of the flow cytometer 800 to control the lasers, fluid flow parameters, and the like. Input/output (I/O) capabilities 897 may be provided also in the system. The memory 895, controller/processor 890, and I/O 897 may be entirely provided as an integral part of the flow cytometer 810. In such an embodiment, a display may also form part of the I/O capabilities 897 for presenting experimental data to users of the cytometer 800. Alternatively, some or all of the memory 895 and controller/processor 890 and I/O capabilities may be part of one or more external devices such as a general purpose computer. In some embodiments, some or all of the memory 895 and controller/processor 890 can be in wireless or wired communication with the cytometer 810. The controller/processor 890 in conjunction with the memory 895 and the I/O 897 can be configured to perform various functions related to the preparation and analysis of a flow cytometer experiment.

The system illustrated in FIG. 8 includes six different detectors that detect fluorescent light in six different wavelength bands (which may be referred to herein as a "filter window" for a given detector) as defined by the configuration of filters and/or splitters in the beam path from the flow cell 825 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 897 can be configured to receive data regarding a flow cytometer experiment having a panel of fluorescent labels and a plurality of cell populations having a plurality of markers, each cell population having a subset of the plurality of markers. The I/O 897 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 895. The controller/processor 890 can be configured to evaluate one or more assignments of labels to markers.

One of skill in the art will recognize that a flow cytometer in accordance with an embodiment of the present invention is not limited to the flow cytometer depicted in FIG. 8, but can include any flow cytometer known in the art. For example, a flow cytometer may have any number of lasers, beam splitters, filters, and detectors at various wavelengths and in various different configurations.

Figure 9:
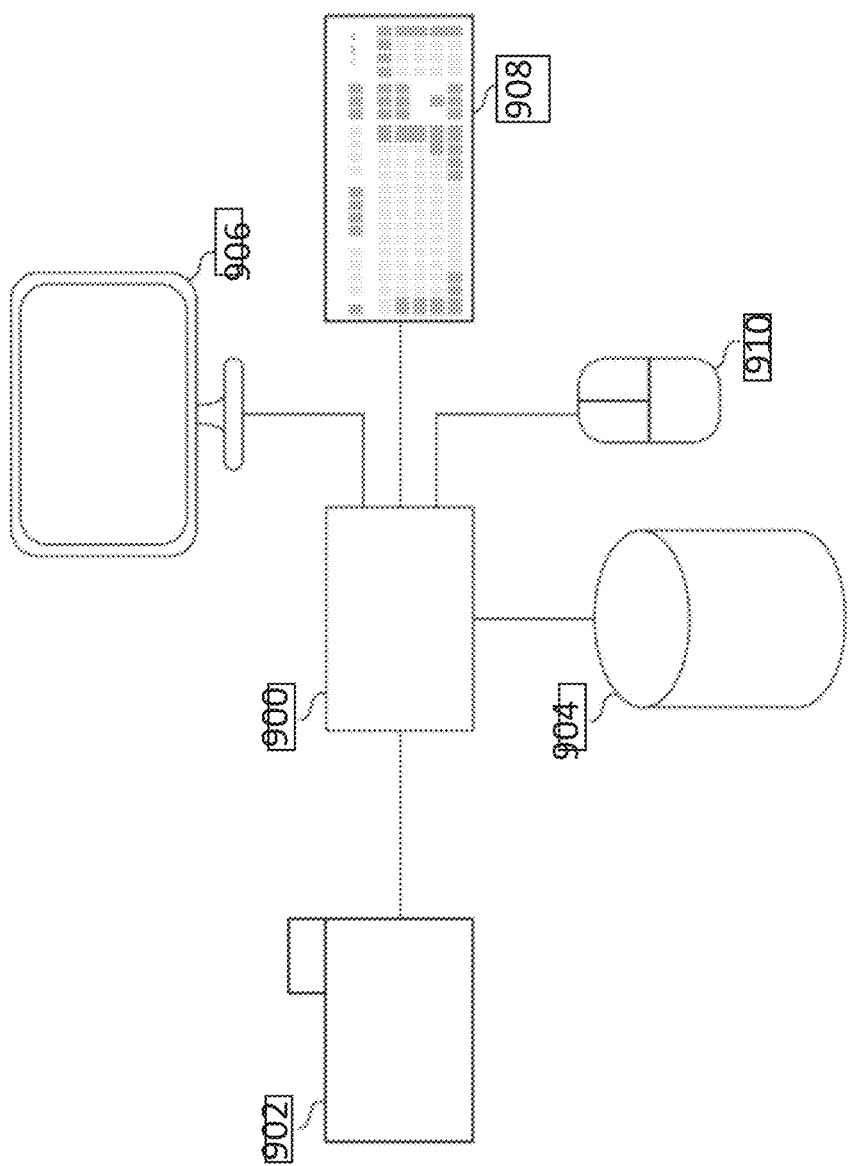
FIG. 9 depicts a functional block diagram for one example of a processor according to certain embodiments.

FIG. 9 shows a functional block diagram for one example of a processor 900, for analyzing and displaying data. A processor 900 can be configured to implement a variety of processes for controlling graphic display of biological events. A flow cytometer 902 can be configured to acquire fluorescent flow cytometer data by analyzing a biological sample (e.g., as described above). The apparatus can be configured to provide biological event data to the processor 900. A data communication channel can be included between the flow cytometer 902 and the processor 900. The data can be provided to the processor 900 via the data communication channel. The processor 900 can be configured to provide a graphical display including plots (e.g., as described above) to display 906. The processor 900 can be further configured to render a gate around populations of fluorescent flow cytometer data shown by the display device 906, overlaid upon the plot, for example. In some embodiments, the gate can be a logical combination of one or more graphical regions of interest drawn upon a single parameter histogram or bivariate plot. In some embodiments, the display can be used to display analyte parameters or saturated detector data.

The processor 900 can be further configured to display fluorescent flow cytometer data on the display device 906 within the gate differently from other events in the fluorescent flow cytometer data outside of the gate. For example, the processor 900 can be configured to render the color of fluorescent flow cytometer data contained within the gate to be distinct from the color of fluorescent flow cytometer data outside of the gate. In this way, the processor 900 may be configured to render different colors to represent each unique population of data. The display device 906 can be implemented as a monitor, a tablet computer, a smartphone, or other electronic device configured to present graphical interfaces.

The processor 900 can be configured to receive a gate selection signal identifying the gate from a first input device. For example, the first input device can be implemented as a mouse 910. The mouse 910 can initiate a gate selection signal to the processor 900 identifying the population to be displayed on or manipulated via the display device 906 (e.g., by clicking on or in the desired gate when the cursor is positioned there). In some implementations, the first device can be implemented as the keyboard 908 or other means for providing an input signal to the processor 900 such as a touchscreen, a stylus, an optical detector, or a voice recognition system. Some input devices can include multiple inputting functions. In such implementations, the inputting functions can each be considered an input device. For example, as shown in FIG. 9, the mouse 910 can include a right mouse button and a left mouse button, each of which can generate a triggering event.

The triggering event can cause the processor 900 to alter the manner in which the fluorescent flow cytometer data is displayed, which portions of the data is actually displayed on the display device 906, and/or provide input to further processing such as selection of a population of interest for analysis.

In some embodiments, the processor 900 can be configured to detect when gate selection is initiated by the mouse 910. The processor 900 can be further configured to automatically modify plot visualization to facilitate the gating process. The modification can be based on the specific distribution of data received by the processor 900.

The processor 900 can be connected to a storage device 904. The storage device 904 can be configured to receive and store data from the processor 900. The storage device 904 can be further configured to allow retrieval of data, such as fluorescent flow cytometer data, by the processor 900.

A display device 906 can be configured to receive display data from the processor 900. The display data can comprise plots of fluorescent flow cytometer data and gates outlining sections of the plots. The display device 906 can be further configured to alter the information presented according to input received from the processor 900 in conjunction with input from apparatus 902, the storage device 904, the keyboard 908, and/or the mouse 910.

In some implementations the processor 900 can generate a user interface to receive example events for sorting. For example, the user interface can include a control for receiving example events or example images. The example events or images or an example gate can be provided prior to collection of event data for a sample, or based on an initial set of events for a portion of the sample.

Computer-Controlled Systems

Aspects of the present disclosure further include computer-controlled systems, where the systems further include one or more computers for complete automation or partial automation. In some embodiments, systems include a computer having a computer readable storage medium with a computer program stored thereon, where the computer program when loaded on the computer includes instructions for clustering fluorescent flow cytometer data into populations according to one or more different parameters (i.e., fluorochromes), determining the spillover spreading between each detector-parameter pair (i.e., by calculating spillover spreading coefficients), creating a spillover spreading matrix demonstrating how the detection of a particular parameter by its corresponding detector is impacted by spillover from other parameters, altering the fluorescent flow cytometer data to compensate for spillover spreading by subtracting the magnitude of the spillover spreading as determined by the spillover spreading matrix, evaluating the quality of different partitions separating distinct populations of fluorescent flow cytometer data by calculating Matthew's correlation coefficient with respect to thresholds distinguishing between populations that are positive for a given parameter and population that are negative for a given parameter, and classifying (i.e., phenotyping) adjusted populations of fluorescent flow cytometer data.

In embodiments, the system is configured to analyze the data within a software or an analysis tool for analyzing flow cytometer data or nucleic acid sequence data, such as FlowJo® (Ashland, OR). FlowJo® is a software package developed by FlowJo LLC (a subsidiary of Becton Dickinson) for analyzing flow cytometer data. The software is configured to manage flow cytometer data and produce graphical reports thereon (https://www(dot)flowjo(dot)com/learn/flowjo-university/flowjo). The initial data can be analyzed within the data analysis software or tool (e.g., FlowJo®) by appropriate means, such as manual gating, cluster analysis, or other computational techniques. The instant systems, or a portion thereof, can be implemented as software components of a software for analyzing data, such as FlowJo®. In these embodiments, computer-controlled systems according to the instant disclosure may function as a software "plugin" for an existing software package, such as FlowJo®.

In embodiments, the system includes an input module, a processing module and an output module. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor, or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, processors include analog electronics which allows the user to manually align a light source with the flow stream based on the first and second light signals. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows NT, Windows XP, Windows 7, Windows 8, iOS, Sun Solaris, Linux, OS/400, Compaq Tru64 Unix, SGI IRIX, Siemens Reliant Unix, and others.

Figure 10:
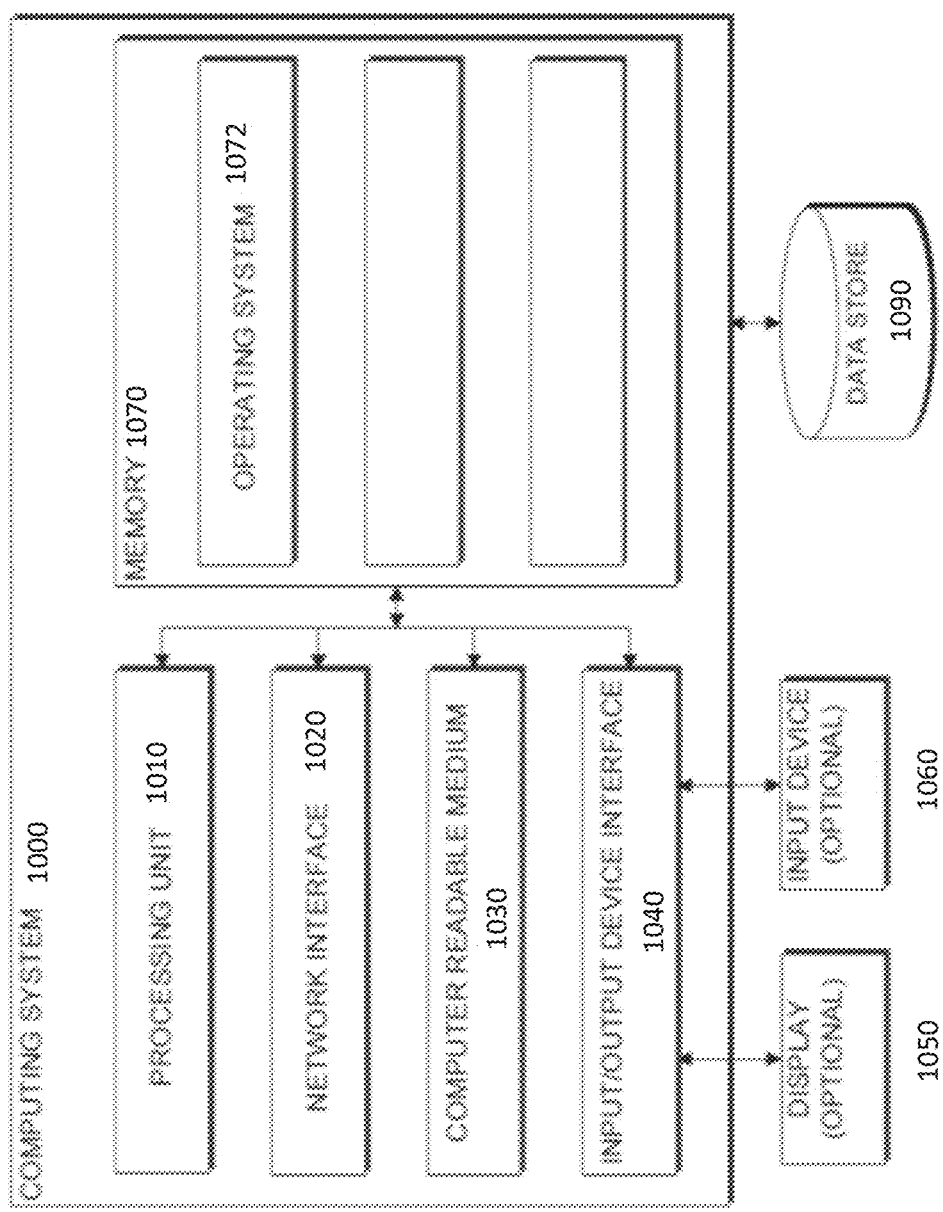
FIG. 10 depicts a block diagram of a computing system according to certain embodiments.

FIG. 10 depicts a general architecture of an example computing device 1000 according to certain embodiments. The general architecture of the computing device 1000 depicted in FIG. 10 includes an arrangement of computer hardware and software components. It is not necessary, however, that all of these generally conventional elements be shown in order to provide an enabling disclosure. As illustrated, the computing device 1000 includes a processing unit 1010, a network interface 1020, a computer readable medium drive 1030, an input/output device interface 1040, a display 1050, and an input device 1060, all of which may communicate with one another by way of a communication bus. The network interface 1020 may provide connectivity to one or more networks or computing systems. The processing unit 1010 may thus receive information and instructions from other computing systems or services via a network. The processing unit 1010 may also communicate to and from memory 1070 and further provide output information for an optional display 1050 via the input/output device interface 1040. For example, an analysis software (e.g., data analysis software or program such as FlowJo®) stored as executable instructions in the non-transitory memory of the analysis system can display the flow cytometry event data to a user. The input/output device interface 1040 may also accept input from the optional input device 1060, such as a keyboard, mouse, digital pen, microphone, touch screen, gesture recognition system, voice recognition system, gamepad, accelerometer, gyroscope, or other input device.

The memory 1070 may contain computer program instructions (grouped as modules or components in some embodiments) that the processing unit 1010 executes in order to implement one or more embodiments. The memory 1070 generally includes RAM, ROM and/or other persistent, auxiliary or non-transitory computer-readable media. The memory 1070 may store an operating system 1072 that provides computer program instructions for use by the processing unit 1010 in the general administration and operation of the computing device 1000. Data may be stored in data storage device 1090. The memory 1070 may further include computer program instructions and other information for implementing aspects of the present disclosure.

Computer-Readable Storage Media

Aspects of the present disclosure further include non-transitory computer readable storage media having instructions for practicing the subject methods. Computer readable storage media may be employed on one or more computers for complete automation or partial automation of a system for practicing methods described herein. In some embodiments, instructions in accordance with the method described herein can be coded onto a computer-readable medium in the form of "programming", where the term "computer readable medium" as used herein refers to any non-transitory storage medium that participates in providing instructions and data to a computer for execution and processing. Examples of suitable non-transitory storage media include a floppy disk, hard disk, optical disk, magneto-optical disk, CD-ROM, CD-R magnetic tape, non-volatile memory card, ROM, DVD-ROM, Blue-ray disk, solid state disk, and network attached storage (NAS), whether or not such devices are internal or external to the computer. In some instances, instructions may be provided on an integrated circuit device. Integrated circuit devices of interest may include, in certain instances, a reconfigurable field programmable gate array (FPGA), an application specific integrated circuit (ASIC) or a complex programmable logic device (CPLD). A file containing information can be "stored" on computer readable medium, where "storing" means recording information such that it is accessible and retrievable at a later date by a computer. The computer-implemented method described herein can be executed using programming that can be written in one or more of any number of computer programming languages. Such languages include, for example, Java (Sun Microsystems, Inc., Santa Clara, CA), Visual Basic (Microsoft Corp., Redmond, WA), and C++ (AT&T Corp., Bedminster, NJ), as well as any many others.

In some embodiments, computer readable storage media of interest include a computer program stored thereon, where the computer program when loaded on the computer includes instructions for clustering fluorescent flow cytometer data into populations according to one or more different parameters, determining the spillover spreading between each detector-parameter pair (i.e., by calculating spillover spreading coefficients), creating a spillover spreading matrix demonstrating how the detection of a particular parameter by its corresponding detector is impacted by spillover from other parameters, altering the fluorescent flow cytometer data to compensate for spillover spreading by subtracting the magnitude of the spillover spreading as determined by the spillover spreading matrix, evaluating the quality of different partitions separating distinct populations of fluorescent flow cytometer data by calculating Matthew's correlation coefficient with respect to thresholds distinguishing between populations that are positive for a given parameter and population that are negative for a given parameter, and classifying (i.e., phenotyping) adjusted populations of fluorescent flow cytometer data.

In embodiments, the system is configured to analyze the data within a software or an analysis tool for analyzing flow cytometer data or nucleic acid sequence data, such as FlowJo®. The initial data can be analyzed within the data analysis software or tool (e.g., FlowJo®) by appropriate means, such as manual gating, cluster analysis, or other computational techniques. The instant systems, or a portion thereof, can be implemented as software components of a software for analyzing data, such as FlowJo®. In these embodiments, computer-controlled systems according to the instant disclosure may function as a software "plugin" for an existing software package, such as FlowJo®.

The computer readable storage medium may be employed on more or more computer systems having a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor, or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, Python, C++, other high level or low level languages, as well as combinations thereof, as is known in the art. The operating system also provides scheduling, input-output control, file and data management, memory management, and communication control and related services, all in accordance with known techniques.

Utility

The subject devices, methods and computer systems find use in a variety of applications where it is desirable to increase resolution and accuracy in the determination of parameters for analytes (e.g., cells, particles) in a biological sample. For example, the present disclosure finds use in analyzing data that is affected by spillover spreading. Because flow cytometry often involves the collection of multiple fluorescent parameters by multiple detectors, detected fluorescent light intensities may be erroneously increased due to the same light being detected by multiple detectors. As such, the present disclosure finds use during the analysis of flow cytometer data that contains signals from multiple fluorochromes. The subject devices, methods and computer systems also find use in classifying (i.e., phenotyping) populations of flow cytometer data that would normally be mischaracterized due to the effects of spillover spreading. In some embodiments, the subject methods and systems provide fully automated protocols so that adjustments to data require little, if any, human input.

The present disclosure can be employed to characterize many types of analytes, in particular, analytes relevant to medical diagnosis or protocols for caring for a patient, including but not limited to: proteins (including both free proteins and proteins and proteins bound to the surface of a structure, such as a cell), nucleic acids, viral particles, and the like. Further, samples can be from in vitro or in vivo sources, and samples can be diagnostic samples.

Kits

Aspects of the present disclosure further include kits, where kits include storage media such as a floppy disk, hard disk, optical disk, magneto-optical disk, CD-ROM, CD-R magnetic tape, non-volatile memory card, ROM, DVD-ROM, Blue-ray disk, solid state disk, and network attached storage (NAS). Any of these program storage media, or others now in use or that may later be developed, may be included in the subject kits. In embodiments, the program storage media include instructions for clustering fluorescent flow cytometer data into populations, determining the spillover spreading of the populations, adjusting flow cytometer data based on spillover spreading, as well as determining partitions between the adjusted flow cytometer data (e.g., as described above). In embodiments, the instructions contained on computer readable media provided in the subject kits, or a portion thereof, can be implemented as software components of a software for analyzing data, such as FlowJo®. In these embodiments, computer-controlled systems according to the instant disclosure may function as a software "plugin" for an existing software package, such as FlowJo®.

In addition to the above components, the subject kits may further include (in some embodiments) instructions, e.g., for installing the plugin to the existing software package such as FlowJo®. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Although the foregoing invention has been described in some detail by way of illustration and example for purposes of clarity of understanding, it is readily apparent to those of ordinary skill in the art in light of the teachings of this invention that some changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A system comprising:
  a particle analyzer component configured to obtain fluorescent flow cytometer data; and
  a processor comprising memory operably coupled to the processor wherein the memory comprises instructions stored thereon, which when executed by the processor, cause the processor to:

cluster the fluorescent flow cytometer data into populations;
determine a measure of spillover spreading for the populations of fluorescent flow cytometer data;
adjust the populations of fluorescent flow cytometer data based on the determined spillover spreading to generate distinct spillover spreading adjusted populations; and
establish partitions between the distinct spillover spreading adjusted populations of fluorescent flow cytometer data to classify the distinct spillover spreading adjusted populations of fluorescent flow cytometer data.

2. The system according to claim 1, wherein the fluorescent flow cytometer data is clustered into populations based on positivity or negativity of the fluorescent flow cytometer data with respect to particular fluorochromes.

3. The system according to claim 1, wherein the fluorescent flow cytometer data is determined to be positive or negative for a particular fluorochrome based on a relationship of the fluorescent flow cytometer data to a threshold value.

4. The system according to claim 1, wherein determining spillover spreading comprises quantifying the extent to which fluorescent flow cytometer data collected by a fluorescent light detector is increased by the collection of light emitting from a particular fluorochrome.

5. The system according to claim 1, wherein determining spillover spreading comprises calculating a spillover spreading coefficient for a fluorescent light detector-fluorochrome pair.

6. The system according to claim 5, wherein the spillover spreading coefficient is calculated according to Equation 1:

$$SS = \frac{\Delta \sigma_f}{\sqrt{\Delta d}} = \frac{\sqrt{(\sigma_{pos})^2 - (\sigma_{neg})^2}}{\sqrt{d_{pos} - d_{neg}}}$$

wherein:
SS is the spillover spreading coefficient;
$\Delta \sigma_f$ is an incremental standard deviation indicating the spread of the emission between the positive and negative fluorescent flow cytometer data collected from a fluorochrome; and
$\Delta d$ is a difference in the intensity of the fluorescent light between the positive and negative fluorescent flow cytometer data received by a fluorescent light detector.

7. The system according to claim 5, wherein calculating the spillover spreading coefficient comprises assuming that the intensity of fluorescent light collected by the fluorescent light detector for the negative population of flow cytometer data is zero.

8. The system according to claim 7, wherein the spillover spreading coefficient is calculated according to Equation 2:

$$SS = \frac{\sqrt{\sigma^2 - \sigma_0^2}}{\sqrt{d}}$$

wherein:
SS is the spillover spreading coefficient;
$\sigma^2$ is the standard deviation of the positive population of fluorescent flow cytometer data;
$\sigma_0^2$ is an estimate of the standard deviation of the negative population of fluorescent flow cytometer data; and
d is the intensity of light collected by a fluorescent light detector.

9. The system according to claim 8, wherein $\sigma_0^2$ is calculated by linear regression.

10. The system according to claim 1, wherein the fluorescent flow cytometer data is collected from light emitting from a plurality of different fluorochromes.

11. The system according to claim 10, wherein the plurality of different fluorochromes ranges from 2 to 20 different fluorochromes.

12. The system according to claim 10, wherein the plurality of different fluorochromes ranges from 3 to 5 different fluorochromes.

13. The system according to claim 10, wherein a spillover spreading coefficient is calculated for each fluorescent light detector-fluorochrome pair.

14. The system according claim 10, wherein the spillover spreading coefficients calculated for each fluorescent light detector-fluorochrome pair are combined in a spillover spreading matrix.

15. The system according to claim 14, further comprising computing the magnitude of spillover spreading for each of the plurality of different fluorochromes based on the spillover spreading matrix.

16. The system according to claim 15, wherein adjusting fluorescent flow cytometer data comprises subtracting the magnitude of the spillover spreading for each of the plurality of different fluorochromes from the populations of fluorescent flow cytometer data corresponding to that fluorochrome.

17. The system according to claim 1, wherein establishing partitions between distinct spillover spreading adjusted populations of fluorescent flow cytometer data comprises evaluating the separation of the distinct spillover spreading adjusted populations relative to a threshold value.

18. The system according to claim 17, wherein evaluating the separation of distinct spillover spreading adjusted populations relative to a threshold value comprises calculating Matthew's correlation coefficient.

19. The system according to claim 18, wherein the fluorescent flow cytometer data does not contain positive data for at least one fluorochrome.

20. The system according to claim 19, wherein evaluating the separation of distinct spillover spreading adjusted populations relative to a threshold value comprises calculating balanced accuracy.

21. The system according to claim 1, wherein the distinct spillover spreading adjusted populations of fluorescent flow cytometer data are partitioned according to a hierarchy.

22. The system according to claim 21, wherein the hierarchy specifies the association between a spillover spreading adjusted population of fluorescent flow cytometer data exhibiting positivity or negativity for particular fluorochromes, and a corresponding phenotype.

* * * * *